United States Patent

Hulls et al.

[11] 3,908,167
[45] Sept. 23, 1975

[54] EXHAUST-RESPONSIVE ENGINE SPEED AND CONDITION INDICATOR

[75] Inventors: Leonard Robin Hulls, Marblehead; Stephen Clow Hadden, Natick, both of Mass.

[73] Assignee: RCA Corporation, New York, N.Y.

[22] Filed: June 5, 1974

[21] Appl. No.: 476,444

[52] U.S. Cl. ............... 324/166; 324/169; 324/175; 356/201; 250/573
[51] Int. Cl.² ................ G01P 3/48; G01N 21/06
[58] Field of Search ....... 73/116; 340/262; 324/166, 324/168, 175, 169; 356/201; 250/573

[56] References Cited
UNITED STATES PATENTS
3,731,743  5/1973  Marshall ............................ 356/201
3,832,635  8/1974  Cass ................................... 324/166

*Primary Examiner*—Robert J. Corcoran
*Assistant Examiner*—Rolf Hille
*Attorney, Agent, or Firm*—Edward J. Norton; Carl V. Olson

[57] ABSTRACT

The speed in RPM and the condition, of internal combustion engines is determined from the engine exhaust. An engine has $x$ ignitions per second depending on engine speed, has $y$ ignitions per revolution of the crankshaft depending on number of cylinders and whether two-stroke or four-stroke cycle, and has an engine speed in rpm equal to $x$ times the constant $60/y$. A light beam is projected from a source through the exhaust gas exiting from the engine to a photodetector to produce an electrical signal having a frequency which varies over a predetermined range determined by the operating speed range of the engine. A band pass filter passes the frequencies in the predetermined range to a phase-locked oscillator. The error signal developed to make the oscillator track the frequency of the signal varies in accordance with engine speed, and is applied to an electrical meter calibrated to indicate engine speed in revolutions per minute. Engine condition is indicated by an elapsed time counter measuring the time taken in an acceleration burst test to accelerate from a low or idle speed to a high or top speed.

9 Claims, 2 Drawing Figures

EXHAUST-RESPONSIVE ENGINE SPEED AND CONDITION INDICATOR

BACKGROUND OF THE INVENTION

The cost, complexity and numbers of internal combustion engines, both spark ignition and diesel engines, continuously increase and give rise to an increasing need for diagnostic and preventive maintenance services, and give rise to a more urgent need for apparatus by which relatively unskilled mechanics can diagnosis engine conditions in an expeditious and accurate manner. In the performance of diagnostic tests, it is often necessary to attach instruments of various kinds to an engine to get quantitative measures of various engine parameters such as engine speed in RPM, engine temperature, engine compression, engine ignition, etc. The attachment of an instrument to an engine requires a large degree of skill on the part of the mechanic, and more importantly, it consumes a significant amount of time during which the engine and vehicle are out of service. For this reason, it would be very desirable to be able to measure the RPM of an engine, and make other related measurements, for example, without having to mechanically attach a tachometer to a rotating part of an engine.

SUMMARY OF THE INVENTION

The speed in revolutions per minute of an internal combustion engine is determined by apparatus positioned to optically detect puffs of exhaust gases from the engine exhaust pipe. The puffs of exhaust gases result from ignitions in individual cylinders of the engine, and the frequency of the puffs is directly related to engine speed. An acceleration burst test giving a measure of the condition of the engine is performed without any mechanical connection to the engine by recording the time elapsed while accelerating from a low speed to a high speed, the speeds being measured by the apparatus responsive to engine exhaust gas puffs.

DESCRIPTION OF THE PREFERRED EMBODIMENT

Figure 1:
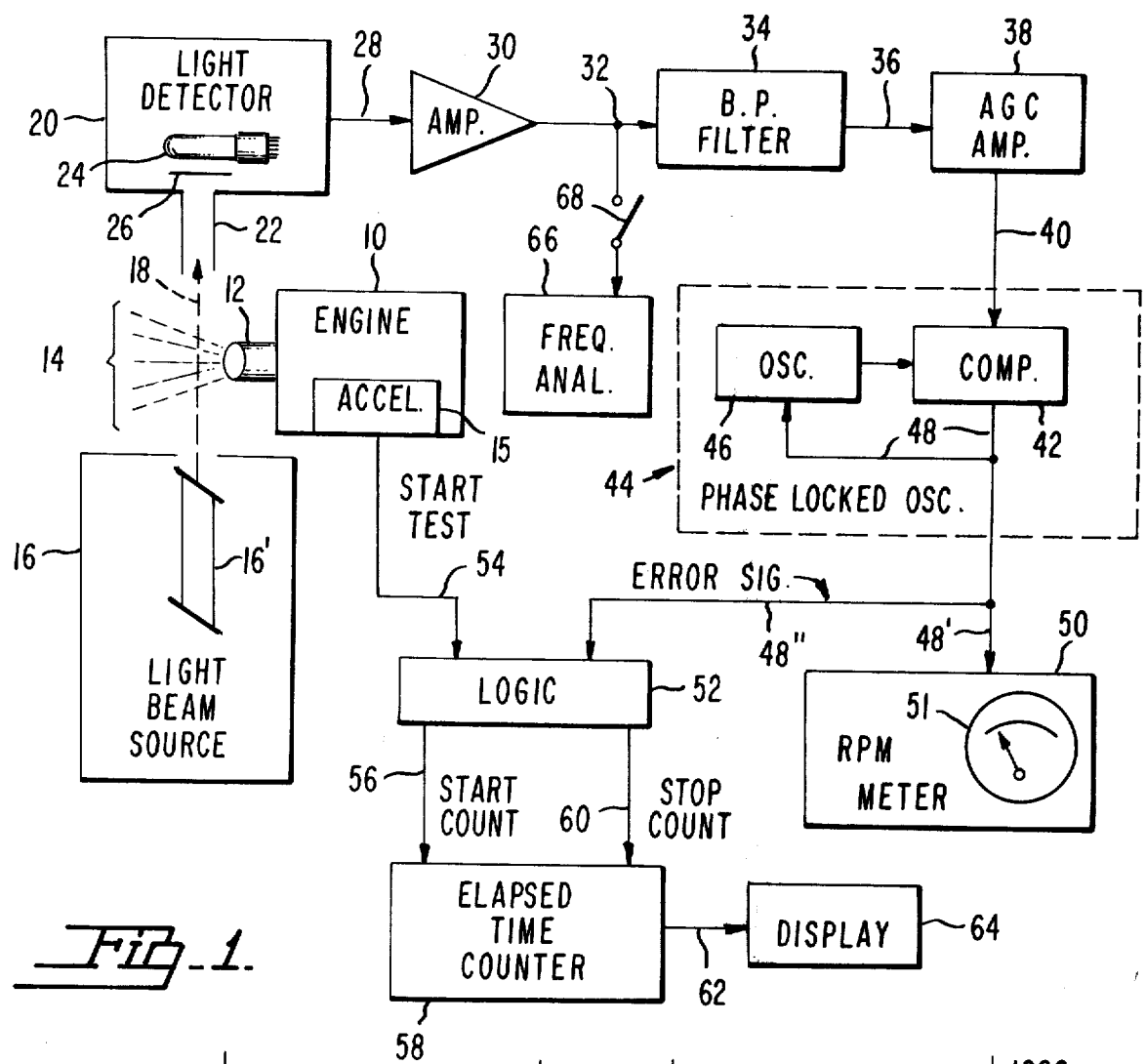
FIG. 1 is a block diagram of a system constructed according to the teachings of the invention for measuring the speed in revolutions per minute of an internal combustion engine, and for making an acceleration burst test of engine condition.

Referring now to FIG. 1, there is shown an internal combustion engine 10 having an exhaust pipe 12 from which exhaust gases 14 spew. The engine includes an accelerator pedal 15 for causing an acceleration of the engine to any speed between an idle speed and a top speed. A light beam source 16 is positioned to project a light beam 18 through the exhaust gases 14 to a light detector 20. The light beam source 16 may comprise a helium-neon laser 16' such as, for example, a Spectra-Physics Company Model 155 laser. Alternatively, other light beam sources may be employed, such as lasers providing light of a different desired frequency, or an incandescent lamp or an arc lamp, combined with beam-forming optics.

The light detector 20 is in a light-tight box constructed to receive the light beam from source 16 through a pipe 22 which may have a length of about six inches and which is provided for the purpose of shielding the detector from ambient light. The light detector 20 includes a photodetector 24 which may be a Type 2022 Vacuum tube photo diode manufactured by RCA Corporation. A filter 26 is inserted in the light path to pass light having solely the frequency or frequencies emitted by the laser light beam source 16'. According to the actually-constructed example of the invention being described, the filter 26 may be a Ealing type TFP interference filter, Part No. 26-5272, distributed by the Ealing Corporation of Cambridge, Mass. The photo diode 24 in the light detector 20 is electrically connected with well-known electrical circuits so that an electrical output signal is produced on output lead 28 which varies in amplitude in accordance with the amount of light reaching the photo diode 24.

The signal on lead 28 is amplified in amplifier 30 which may be any suitable amplifier, such as a Honeywell instrumentation amplifier, or an Intronics Type FA541 operational amplifier. After amplification, the signal is applied over line 32 to a band pass filter 34. The purpose of filter 34 is to filter out unwanted high frequency noise and transients and to ac-couple the signal to an output lead 36. The filter 34 may, for example, be a four-pole Butterworth active filter having a pass band from 15 to 500 Hz.

The output at 36 from the filter is applied to an automatic gain control amplifier 38, which is provided for the purpose of eliminating large, slowly-occurring changes in signal amplitude. That is, the AGC amplifier 38 should be capable of properly amplifying both large-amplitude signal variations due to puffs of relatively dense exhaust smoke, as well as low amplitude signal variations due to puffs of relatively transparent exhaust gases. It is desirable that the amplifier 38 be capable of eliminating up to 20 db of slowly-occurring amplitude variations.

The output at 40 from the amplifier 38 is applied to a comparator 42 within a phase locked oscillator 44, which also contains an oscillator 46. The phase locked oscillator 44 may, for example, be a Type CD4046 phase locked oscillator made by RCA Corporation. The comparator compares the frequency of the signal from the AGC amplifier 38 with the output frequency from free-running oscillator 46, and produces an error signal on lead 48 which is applied to the oscillator 46 in such a way as to make the oscillator frequency track or follow the frequency of the signal from amplifier 38. The error signal on lead 48 is an electrical signal which varies in amplitude in proportion with variations in the frequency of the signal on lead 40 from the amplifier 38. The error signal is applied over line 48' to a meter 50 providing a speed indicated in revolutions per minute.

The meter 50 may be a digital meter or an analog meter. If an analog meter it may include a conventional ammeter 51 together with a suitable resistor network providing a scale factor or proportionality factor such that the error signal voltage applied to the meter 50 can directly indicate the speed in rpm on the face of the ammeter 51. The meter 50 may be provided with front panel knobs which can be set to provide different scale factors depending on the number of cylinders possessed by the engine being tested, and depending on whether the engine is a two-stroke or a four-stroke cycle. The meter 50 may also be provided with an additional adjustable knob for selecting a scale factor depending on whether the particular engine being tested has an exhaust manifold geometry such that the electrical signals derived from the exhaust gases contain a preponderance of second harmonic components, or third harmonic components, instead of components mainly limited to the fundamental frequencies.

The error signal from the phase locked oscillator 44 is applied over a third path 48″ to a logic unit 52 forming part of an acceleration burst testing apparatus for measuring general engine power performance. The logic unit 52 receives a "start test" input signal over line 54 from the accelerator 15 in the engine 10 when the accelerator is suddenly depressed all the way. The logic unit 52 produces an output on line 56 which is applied to the "start count" input of an elapsed time counter 58. The logic also applies an output signal over line 60 to the "stop count" input of the counter 58. The output of counter 58 is applied over line 62 to any suitable analog or digital type display 64 for displaying the time period between the starting of the counter and the stopping of the counter. The counter 58 and a display 64 should have a time resolution at least as fine as 10 milliseconds.

The system shown in FIG. 1 additionally includes a frequency analyzer 66 which is connectable by means of a switch 68 to the signal path at the output 32 of the amplifier 30. The frequency analyzer 66 may be a Kay Sonograph Voice Analyzer capable of producing a chart called a Sonogram graphically showing the many frequency components of a signal applied to the input of the analyzer. Such an analyzer is intended for analyzing the frequency components of human speech, and is also useful, as will be described, for analyzing frequency components of electrical signals derived in an electro-optical manner from engine exhaust gases.

OPERATION

In the operation of the system shown in FIG. 1, the engine 10 is initially operated at an idle speed, and the light beam source 16 and light detector 20 are positioned near the end of the exhaust pipe 12 so that the exhaust intersects or crosses the path of the light beam 18 produced by light beam source 16. The light beam passes through the exhaust and through the filter 26, and impinges on the photo diode 24 which produces an electrical signal on output lead 28. The electrical signal varies in amplitude in accordance with the variation in opacity of the exhaust gases to the particular light frequency produced by the laser 16′. The phot diode 24 responds very rapidly to changes in the amplitude of the light received, and produces an electrical signal which responds quickly enough to follow or represent individual puffs of exhaust gases due to ignitions in respective individual cylinders of the engine. The signal is amplified in amplifier 30 and applied over line 32 to band pass filter 34.

For any particular engine, the engine speed in revolutions per minute varies directly with the number of ignitions per second in the engine. A two-stroke engine has one ignition per cylinder, per revolution of the crankshaft. Therefore, a six-cylinder, two-stroke engine has six ignitions per revolution of the crankshaft. Then, ignitions per second can be multiplied by 60 to get ignitions per minute, and this can be divided by six to give engine speed in revolutions per minute.

The number of ignitions per revolution of the crankshaft may be designated $y$, which has been shown to be six in the case of a two-stroke, six-cylinder engine. A four-stroke, six-cylinder engine has half as many ignitions per revolution of the crankshaft, and thus has a $y$ equal to 3. The proportionality factor between engine speed in revolutions per minute, and ignitions per second designated $x$, is that engine speed in rpm is equal to the ignitions per second, $x$, multiplied by the constant 60 $y$, where $y$ is the ignitions per revolution of the crankshaft of the particular engine. In the case of a six-cylinder, four-stroke engine, speed in rpm is equal to ignitions per second multiplied by 20.

Figure 2:
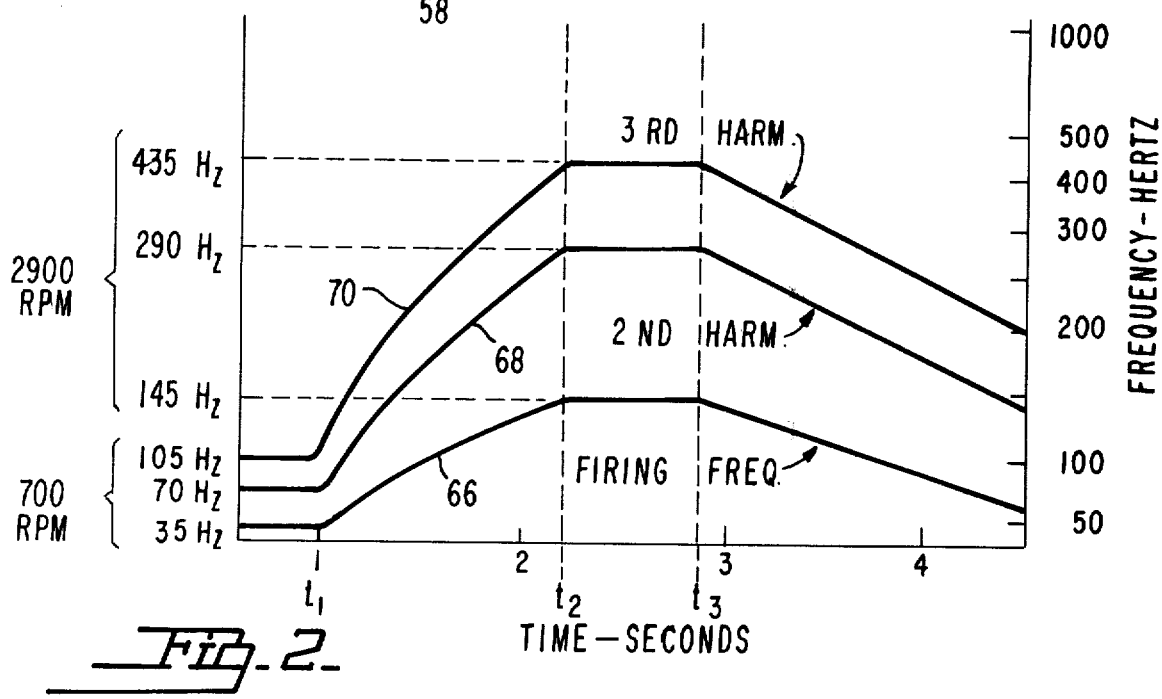
FIG. 2 is a chart showing frequency components of a signal derived by detecting the amount of light passed through the exhaust gases of an internal combustion engine.

The frequency components in the electrical signal generated by the light detector 20 are shown in the chart of the FIG. 2. The chart is an idealized representation of a "Sonogram" produced by the frequency analyzer 66 when connected through switch 68 to the output of amplifier 30. The chart of FIG. 2 includes a logarithmic vertical scale extending from 20 Hz (cycles per second) to 1000 Hz. The horizontal scale represents time in seconds. The frequency components appearing on the chart were obtained from a test made on the exhaust of a six-cylinder in-line four-stroke cycle diesel engine designated the Continental LD 465.

The chart of FIG. 2 includes a curve or trace 66 representing the number of ignitions per second in a six-cylinder engine. The engine was initially operated at an idling speed, was then rapidly accelerated to a top speed during a time period extending from $t_1$ to $t_2$, was then maintained at the top speed until the time $t_3$, after which the engine speed was allowed to fall back to the idling speed. During the period prior to the time $t_1$, the electrical signal representing ignitions per seconds, $x$, is shown to have a frequency of 35 Hz (cycles per second). Since the engine is a six-cylinder, four-stroke diesel engine, $y$ is equal to 3. Therefore, according to the formula that engine speed in rpm equals $60x/y$, the engine speed in rpm for the idling condition is $(60 \times 35)/3$ rpm, or 700 rpm.

During the time period from time $t_1$ to time $t_2$ the ignitions per second increased from 35 to 145, the top speed representing a speed of 2900 rpm. It is seen that the frequency of the fundamental component 66 of the electrical signal derived from the exhaust opacity is directly convertable into engine speed in revolutions per minute.

In addition to the fundamental frequency components represented at 66 in FIG. 2, there may also be second harmonic frequency components 68 and third harmonic frequency components 70. These harmonic components of the fundamental frequency 66 vary in frequency in direct proportion with the variation in the speed of the engine, although with conversion factors of two and three, respectively, compared with the factor applying in relation to the fundamental frequency. In some engine designs, the second or third harmonic frequency components may in fact be more prominent and have higher amplitudes than the fundamental component. In this event, the most prominent harmonic frequency component may be used, with an appropriate proportionality factor, to determine the engine rpm.

The electrical signal derived from light detector 20 and amplifier 30 is passed through a band pass filter 34 which is constructed to pass the range of frequency components produced by engines under test when operated between idling speeds and top speeds. The chart of FIG. 2 shows the frequencies which should be passed by the filter 34. Frequencies higher than the maximum frequencies generated with the engine is operated at top speed should be blocked by the filter 34 so that they do not interfere with the proper operation of the phase locked oscillator 44 after being passed through the AGC amplifier 38.

The error signal produced by the phase locked oscillator 44 and applied over line 48' to the rpm meter 50 produces an indication on the ammeter 51 of the actual speed of the engine in revolutions per minute. The phase locked oscillator 44 will normally lock on to, or track, the fundamental frequency component of the signal received on line 40. During idling conditions, the meter 51 will normally indicate the idling speed which, in the case a particular engine, will be known to fall in a particular range such as 600 to 800 rpm. If the meter indicates a much higher idling speed such as 1400 rpm, the operator will realize that the phase locked oscillator 44 has locked onto the second harmonic frequency component rather than the fundamental frequency component. In this case, the operator will turn a scale factor adjustment knob on the meter 50 to cause the meter to correctly indicate a reasonable idling speed, rather than a speed twice as great as the reasonable idling speed. A similar procedure can be followed if the phase locked oscillator 44 locks onto the third harmonic frequency component and a factor of three adjustment is required. Once the scale factor adjustment is made when the engine is idling, correct indications of higher engine speeds are provided by the oscillator as the engine is accelerated and operated at various higher speeds.

The operation of the system in the performance of an acceleration burst test will now be described. An acceleration burst test is a test of the condition of an engine in which the power of the engine is measured by the time taken to accelerate the engine from a predetermined low speed, such as an idling speed, to a predetermined higher speed, such as a top speed. The entire power of the engine is used in accelerating the motion of the moving parts in the engine itself. Engines in the best condition accelerate in the shortest time. The elapsed time performance of an engine under test engine can be compared with a standard elapsed time performance of an engine of the same type which is known to be in top condition.

The burst acceleration test may be started when the engine is in the idling condition by tramping on the accelerator of the engine at a time represented at $t_1$ in FIG. 2. This action closes a switch located at the accelerator 15 of the engine and causes a "start test" signal to be applied over line 54 to the logic unit 52, which in turn applies a "start count" signal to the elapsed time counter 58. The counter 58 then starts counting time and continues to do so until it is stopped by a "stop count" signal on lead 60 from the logic until 52.

Alternatively, the starting of the elapsed time counter 58 4ay be accomplished by the logic until 52 when the signal inout thereto on line 48'' indicatds that the engine speed has been accelerated from the idling speed to an at least slightly higher predetermined speed. This method of starting the counter 58 has the advantage that no electrical connection is necessary between the test apparatus and the engine under test.

While the engine is accelerating, the error signal from the phase locked oscillator 44 continues to represent the increasing speed of the engine. The logic unit 52 is constructed to recognize when the error signal applied thereto reaches a desired predetermined high speed such as a top safe speed, and to then stop the count in the counter 58. The actual value of high speed may be a predetermined standarized speed suitable for use in testing all engines of a particular type. By having standardized low and high speeds for test purposes, the result obtained with any engine tested may be validly compared with the results obtained by testing other engines of the same type. After the counter 58 has been stopped, the elapsed time measured by the counter is displayed on an analog or digital display device 64 for noting by the test operator, or may be automatically printed on a test report sheet by means not shown.

It is therefore seen that the apparatus shown in FIG. 1 is capable of continuously indicating the speed in rpm of an internal combustion engine by means responsive to the exhaust gases exiting from the exhaust pipe of the engine. The engine speed is correctly indicated even when the geometry of the exhaust manifold results in exhaust gas puffs occurring at harmonic frequencies with a greater amplitude than are produced at the fundamental frequency. The apparatus shown also provides a means for performing the acceleration burst test and displaying an elapsed time indication of general engine condition, the shorter elapsed time corresponding with the better engine performance.

What is claimed is:

1. Apparatus responsive to the exhaust from an internal combustion engine having x ignitions per second depending on engine speed, and having y ignitions per revolution of the crankshaft depending on number of cylinders and whether two-stroke or four-stroke cycle, and having an engine speed in rpm equal to $x$ times the constant 60/y, comprising means to project a light beam from a source through the exhaust gas exiting from the engine to a photodetector to produce an electrical signal having a frequency $x$ Hz which varies directly with the operating speed of the engine, frequency detector means translating the varying frequency of said electrical signal to a corresponding amplitude varying signal, and an electrical meter receptive to said amplitude varying signal and calibrated to indicate engine speed in revolutions per minute.

2. Apparatus as defined in claim 1 wherein said frequency detector means comprises a phase locked oscillator.

3. Apparatus as defined in claim 1, and in addition, a band pass filter coupling said frequency varying electrical signal to said frequency detector means and having a passband to limit the frequencies passed to frequencies in the range determined by the operating speed range of the engine.

4. Apparatus as defined in claim 2, and in addition, a band pass filter coupling said frequency varying electrical signal to said phase locked oscillator and having a passband to limit the frequencies passed to frequencies in the range determined by the operating speed range of the engine.

5. Apparatus as defined in claim 1, and in addition, an elapsed time counter, and logic means responsive to operation of the accelerator on said engine to start said elapsed time counter, and responsive to an attained predetermined amplitude signal from said frequency detector means to stop said elapsed time counter, whereby the elapsed time is a measure of the condition of said engine.

6. Apparatus as defined in claim 1, and in addition, an elapsed time counter, and logic means operating following a maximum acceleration of said engine and responsive to a signal from said frequency detector means corresponding to a predetermined low speed to start said elapsed time counter, and responsive to a signal from said frequency detector means corresponding to a predetermined high speed to stop said elapsed time counter, whereby to automatically record the results of an acceleration burst test.

7. Apparatus responsive to the exhaust from an internal combustion engine having x ignitions per second depending on engine speed, and having y ignitions per revolution of the crankshaft depending on number of cylinders and whether two-stroke or four-stroke engine, and having an engine speed in rpm equal to $x$ times the constant $60/y$, comprising means to project a light beam from a source through the exhaust gas exiting from the engine to a photodetector to produce a periodically-varying electrical signal having a fundamental frequency component $x$ Hz and harmonic frequency components which vary over a predetermined range determined by the operating speed range of the engine, a band pass filter receptive to said electrical signal and being operative to pass said fundamental and harmonic frequency components in said predetermined range, a phase-locked oscillator responsive to the output of said band pass filter and including a comparator comparing the frequency of the output of the oscillator with one of said fundamental and harmonic frequency components of the electrical signal and producing an error signal applied to the oscillator to make it track said one of the fundamental and harmonic frequency components, whereby said error signal varies in accordance with engine speed, and an electrical meter receptive also to said error signal and calibrated to indicate engine speed in revolutions per minute for the conditions when the oscillator is locked onto any one of said fundamental or harmonic frequency components of the electrical signal.

8. Apparatus as defined in claim 7, and in addition, an elapsed time counter, and logic means responsive to operation of the accelerator on said engine to start said elapsed time counter, and responsive to an attained predetermined amplitude of the error signal from said phase locked oscillator to stop said elapsed time counter, whereby the elapsed time is a measure of the condition of said engine.

9. Apparatus as defined in claim 7, and in addition, an elapsed time counter, and logic means operating following a maximum acceleration of said engine and responsive to said error signal corresponding to a predetermined low speed to start said elapsed time counter, and responsive to said error signal corresponding to a predetermined high speed to stop said elapsed time counter, whereby to automatically record the results of an acceleration burst test.

* * * * *